United States Patent
Kol

(10) Patent No.: US 8,571,124 B2
(45) Date of Patent: Oct. 29, 2013

(54) MULTIPLE INPUT, MULTIPLE OUTPUT (MIMO) COMMUNICATION SYSTEM OVER IN-PREMISES WIRES

(75) Inventor: Boaz Kol, Hod Hasharon (IL)

(73) Assignee: Sigma Designs Israel S.D.I. Ltd., Tel-Aviv (IL)

( * ) Notice: Subject to any disclaimer, the term of this patent is extended or adjusted under 35 U.S.C. 154(b) by 882 days.

(21) Appl. No.: 12/113,274

(22) Filed: May 1, 2008

(65) Prior Publication Data

US 2008/0273613 A1    Nov. 6, 2008

Related U.S. Application Data

(60) Provisional application No. 60/915,481, filed on May 2, 2007.

(51) Int. Cl.
*H04B 3/00* (2006.01)
*H04B 7/02* (2006.01)

(52) U.S. Cl.
USPC ............ 375/267; 375/257; 375/299; 375/347

(58) Field of Classification Search
USPC .......................... 375/257, 260, 267, 299, 347
See application file for complete search history.

(56) References Cited

U.S. PATENT DOCUMENTS

| | | | |
|---|---|---|---|
| 5,066,939 A | | 11/1991 | Mansfield, Jr. |
| 5,659,543 A | * | 8/1997 | Ater et al. ..................... 370/258 |
| 6,252,755 B1 | | 6/2001 | Willer |
| 6,727,804 B1 | | 4/2004 | Lesguillier et al. |
| 7,170,395 B2 | | 1/2007 | Crenshaw et al. |
| 2002/0027985 A1 | * | 3/2002 | Rashid-Farrokhi ........... 379/417 |
| 2003/0072311 A1 | * | 4/2003 | Pfeiffer ...................... 370/395.1 |
| 2007/0009069 A1 | * | 1/2007 | Kong et al. .................... 375/347 |
| 2008/1026001 | | 10/2008 | Schwager et al. |
| 2009/0060060 A1 | | 3/2009 | Stadelmeier et al. |
| 2009/0110088 A1 | | 4/2009 | Di Giandomenico et al. |
| 2009/0316802 A1 | * | 12/2009 | Tong et al. .................... 375/260 |

FOREIGN PATENT DOCUMENTS

| | | |
|---|---|---|
| EP | 1 643 658 | 4/2006 |
| EP | 1 858 174 | 11/2007 |
| EP | 1 892 843 | 2/2008 |
| EP | 2 028 769 | 2/2009 |
| EP | 2 061 160 | 5/2009 |
| EP | 2 073 471 | 6/2009 |

(Continued)

OTHER PUBLICATIONS

Klaus Dostert, "Power Line Communications", Prentice Hall PTR, NJ, 2001.

(Continued)

*Primary Examiner* — David B. Lugo
(74) *Attorney, Agent, or Firm* — Brown Rudnick LLP

(57) ABSTRACT

A method of communicating across power lines, including communicating data between at least two in-premises network devices along more than one channel, each channel defined by a different two of a plurality of wires in a subscriber premises, a first channel forming a straight path channel and a second channel forming a cross-path channel, and using multiple-input, multiple-output (MIMO) processing and maximum ratio combining (MRC) processing of data received along the plurality of wires, at least a portion of the data being received simultaneously from the straight path channel and the cross-path channel, wherein the wires are phase, neutral and ground wires of a subscriber premises.

7 Claims, 7 Drawing Sheets

(56) References Cited

FOREIGN PATENT DOCUMENTS

| EP | 2 154 789 | 2/2010 |
|---|---|---|
| EP | 2 157 704 | 2/2010 |
| GB | 2 383 724 | 7/2003 |
| WO | WO-2009/024249 | 2/2009 |
| WO | WO-2009/056181 | 5/2009 |

OTHER PUBLICATIONS

Carlos Lopez Giovaneli, Bahram Honary and Patrick G. Farrel, "Space-Frequencey Coded OFDM System for Multi-Wire Power Line Communications", ISPLC 2005.

Lin Hao and Jingbo Guo, A MIMO-OFDM Scheme Over Coupled Multi-Conductor Power-Line Communication Channel, ISPLC 2007.

A.M. Alamouti, "A Simple Transmit Diversity Technique for Wireless Communications", IEEE J. Select. Areas Commun., vol. 16, pp. 1451-1458, Oct. 1998.

Bingeham, G., "Transmission lines as antennas," RF tutorial, pp. 74-82 (Jan. 2001).

Schneider, D., et al, "Precoded Spatial Multiplexing MIMO for Inhome Power Line Communications," (Nov. 30-Dec. 4, 2008).

Stadelmeier, L., et al, "MIMO for Inhome Power Line Communications," (Jan. 14-16, 2008).

Trifonov, P., et al, "Channel re-estimation in OFDM systems with constellation rotation," RWS 2009, pp. 163-166, (2009).

* cited by examiner

MULTIPLE INPUT, MULTIPLE OUTPUT (MIMO) COMMUNICATION SYSTEM OVER IN-PREMISES WIRES

CROSS-REFERENCE TO RELATED APPLICATIONS

This application claims benefit from U.S. Provisional Patent Application No. 60/915,481, filed May 2, 2007, which is hereby incorporated in its entirety by reference.

FIELD OF THE INVENTION

The present invention relates generally to high-speed in-premises networks, such as power line networks and other types of networks.

BACKGROUND OF THE INVENTION

In-premises networks run on in-premises cabling, such as phone line wires, power lines, cable TV lines and data network wiring, which are laid out for every separate unit, such as a house, an apartment or an office.

Power line communications (PLC) networks are either access networks, covering the link between a central office and the customer's premises, or home networks. Access networks may be used for supplying broadband access to homes, for automatic meter reading (AMR) and for other network diagnostics performed by electrical utility companies.

There are two basic types of home power line networks: low-speed and high-speed. The low-speed power line network is designed for command and control signals, setting up the so-called "smart home", where electrical appliances and other devices may be controlled and monitored remotely. This low-speed network usually operates in the low-frequency band in the range 0-500 kHz.

The high-speed power line network is used for distributing broadband services inside the home. Applications may include web-browsing, IPTV, high-quality audio and video, etc. The frequency band used may vary according to the regulations in force in different countries.

A multitude of companies and organizations are developing PLC standards and technologies worldwide. One of the dominant is the HomePlug consortium which released its high speed home networking specification HomePlug AV in December 2005. Another consortium is the Universal Power line Alliance (UPA), which promotes a technology developed by Digital Systems on Silicon (DS2). Panasonic has developed a proprietary PLC technology, called High-Definition PLC (HD-PLC) and two standards committees, the IEEE P1901 and the ITU-T Q4/15 (under the G.HN project), are both working to set standards for power line communications.

The existing networks are designed to communicate at high speeds (around 200 Mbps). However, due to the nature of home power lines, they rarely succeed.

SUMMARY OF THE PRESENT INVENTION

There is provided, in accordance with a preferred embodiment of the present invention, a multiple input, multiple output (MIMO) communications receiver for an in-premises multi-point network. The receiver includes a multiplicity of analog front ends and a MIMO processor. Each analog front end is connectable to a different two of the wires in a subscriber premises. The wires form the shared medium of the network and each front end receives data of one channel. The MIMO processor processes together data received from the channels.

Additionally, in accordance with a preferred embodiment of the present invention, there are two analog front ends and the wires are the phase, neutral and ground power line wires of the premises.

In accordance with a preferred embodiment of the present invention, one analog front end is connectable to the phase and neutral wires and the other analog front end is connectable to the neutral and ground wires.

Alternatively, in accordance with a preferred embodiment of the present invention, one analog front end is connectable to the phase and ground wires and the other analog front end is connectable to the phase and neutral wires.

Further alternatively, in accordance with a preferred embodiment of the present invention, one analog front end is connectable to the phase and ground wires and the other analog front end is connectable to the ground and neutral wires.

Further, in accordance with a preferred embodiment of the present invention, one of the wires is the ground power line wire of the premises.

Alternatively, in accordance with a preferred embodiment of the present invention, there are more than two analog front ends and the wires are the neutral, ground and multiple phase power line wires of the premises.

Further alternatively, the wires are phone line wires of the premises and wherein each the analog front end is connectable to a pair of phone line wires.

There is also provided, in accordance with a preferred embodiment of the present invention, a MIMO power line communications transmitter for an in-premises multi-point network. The transmitter includes a multiplicity of analog front ends and a MIMO processor. Each analog front end is connectable to a different two of the wires in a subscriber premises. The wires form the shared medium of the network and each front end receives data of one channel. The MIMO processor processes data to be transmitted along the channels.

Moreover, in accordance with a preferred embodiment of the present invention, the transmitter includes a mode negotiator to determine the quality of transmission along the channels and to select a mode of operation from a set of pre-defined modes accordingly.

Further, in accordance with a preferred embodiment of the present invention, there are two analog front ends and the wires are the phase, neutral and ground wires of the premises. The pre-defined modes include at least one of: spatial diversity, multiple signals, transmission only on the ground wire, and reduction of power when transmitting across the neutral and ground wires.

Still further, in accordance with a preferred embodiment of the present invention, one analog front end is connectable to the phase and neutral wires and the other analog front end is connectable to the neutral and ground wires.

Alternatively, in accordance with a preferred embodiment of the present invention, one analog front end is connectable to the phase and ground wires and the other analog front end is connectable to the phase and neutral wires.

Further alternatively, in accordance with a preferred embodiment of the present invention, one analog front end is connectable to the phase and ground wires and the other analog front end is connectable to the ground and neutral wires.

Moreover, in accordance with a preferred embodiment of the present invention, one of the wires is a ground power line wire of the premises.

Alternatively, in accordance with a preferred embodiment of the present invention, there are more than two analog front ends and wherein the wires are the neutral, ground and multiple phase power line wires of the premises.

In a further preferred embodiment of the present invention, the wires are phone line wires of the premises and each the analog front end is connectable to a pair of phone line wires.

There is also provided, in accordance with a preferred embodiment of the present invention, a method of communicating across power lines. The method includes communicating data between at least two in-premises network devices along more than one channel, each channel defined by a different two of the wires in a subscriber premises.

Moreover, in accordance with a preferred embodiment of the present invention, the using includes multiple-input, multiple-output processing of data received along the wires.

Further, in accordance with a preferred embodiment of the present invention, the wires are the phase, neutral and ground wires of a subscriber premises.

Alternatively, in accordance with a preferred embodiment of the present invention, the wires are the multiple phase, neutral and ground wires of a subscriber premises.

Finally, in accordance with an alternative preferred embodiment of the present invention, the wires are a pair of phone line wires in a subscriber premises.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
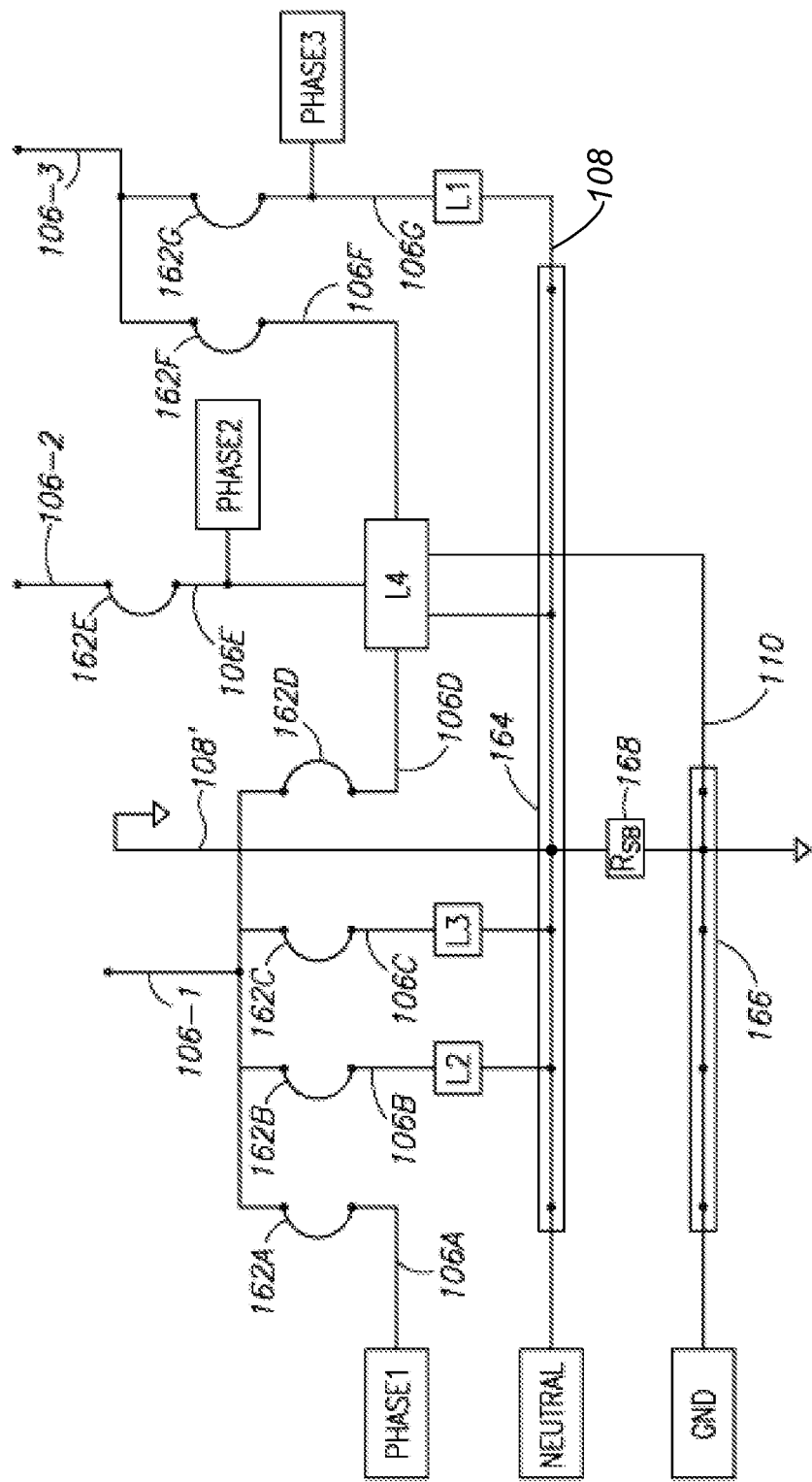
FIG. 1 is a schematic illustration of exemplary connections of power lines in a home.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Power line communication (PLC) networks suffer from a very noisy environment. The current on the power lines is rarely clean and often has spikes, surges and brownouts. To add to this, appliances with heavy energy requirements, such as air conditioners and heaters, add general noise to the power signals.

This noisy environment affects the ability of the networks to provide high speeds of networking with high levels of quality of service. Applicants have realized that the current set of standards may not achieve the levels of speed and quality that consumers have become accustomed to in other communications technologies. Applicants have realized that multiple channels may provide sufficient redundancy and/or increased bandwidth to raise the levels of speed and quality; moreover, since home power lines generally have at least three power line wires, a phase, a neutral and a ground wire, such multiple channels may be transmitted over home power lines without any additional wiring. When there are more than three power line wires, such as when a circuit has multiple phases, more channels may be transmitted.

Applicants have realized that the increased value achieved with the multiple channels may overcome the complications which arise when using the ground wire, due to the requirements on the ground wire as part of the power system of the house.

Reference is now made to FIG. 1, which illustrates standard, power line wiring, for a premises in a building, such as a home, office, apartment, etc. FIG. 1 shows incoming phases 106-x from the electric company, an incoming neutral wire 108' and a ground wire 110. In the exemplary wiring, phase 1 incoming wire 106-1 is branched into four circuits, defined by phase 1 internal wires 106A, 106B, 106C and 106D. Phase 2 incoming wire 106-2 has one circuit, defined by phase 2 internal wire 106E. Likewise, phase 3 incoming wire 106-3 has two circuits, defined by phase 3 internal wire 106F and 106G. Each circuit is protected by a circuit breaker 162A-162G, which makes sure that the current in the circuit does not exceed some predefined limit, usually on the order of Amperes. Circuit breakers 162 protect the network against shortcuts and electrocutions. There is also a main breaker (not shown) to ensure that the overall current carried into the home over all the phases does not exceed a certain limit. As can be seen, most circuits in a premises utilize only one phase of electricity (three phases of electricity are shown though some countries have only two) and there may be multiple circuits on each phase. There may also be multiple phase circuits, particularly for heavy appliances, such as air conditioners and ovens.

Neutral wire 108 connects to any loads, such as loads L1, L2, L3 and L4, which might be on the circuits defined by phase wires 106. Loads L1, L2 and L3 are single phase loads, while load L4 is a multi-phase load. Circuit breakers 162D, 162E and 162F may form a multiple phase circuit breaker.

Neutral wire 108 returns to the initial wire 108' via a first terminal block 164. Ground wire 110 connects to the earth via a second terminal block 166. Not all loads are connected to the ground wire, though most appliances are. A low resistance, shunt resistor 168 may "bond" ground wire 110 and neutral wire 108 together.

Figure 2:
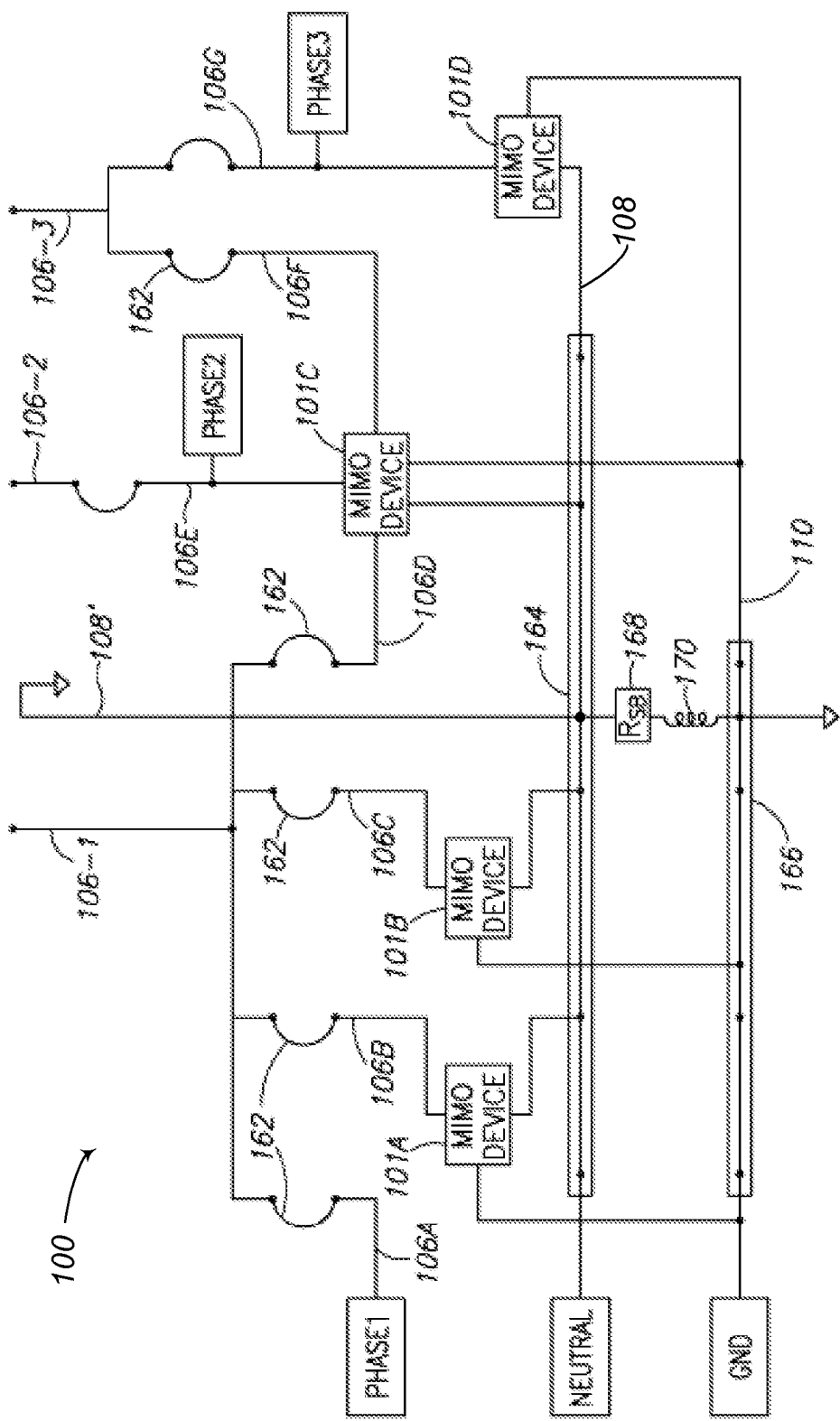
FIG. 2 is a schematic illustration of a novel, in-premises power line communication system, constructed and operative in accordance with a preferred embodiment of the present invention.

Reference is now made to FIG. 2, which illustrates one embodiment of a multiple channel, power line communications system 100. System 100 comprises a plurality of MIMO (multiple input, multiple output) devices 101, connected to various circuits. Thus, MIMO device 101A may be connected to the circuit of phase wire 106B, MIMO device 101B may be connected to the circuit of phase wire 106C, MIMO device 101C may be connected to the multiple phase circuit of phase wires 106D, 106E and 106F and MIMO device 101D may be connected to the circuit of phase wire 106G.

MIMO devices 101 may be power line communication (PLC) devices, which may use the in-premises power lines as a shared medium for communication on the multi-point network. In accordance with a preferred embodiment of the present invention, MIMO devices 101 communicate over the in-premises phase, neutral and ground wires 106, 108 and 110, respectively.

As shown for MIMO device 101C, when there are more than three wires present in the circuit, such as for multiple phase circuits, all wires may be connected to device 101 which may then transmit over more than two channels. The maximum number of channels may be one less than the number of wires.

Figure 3:
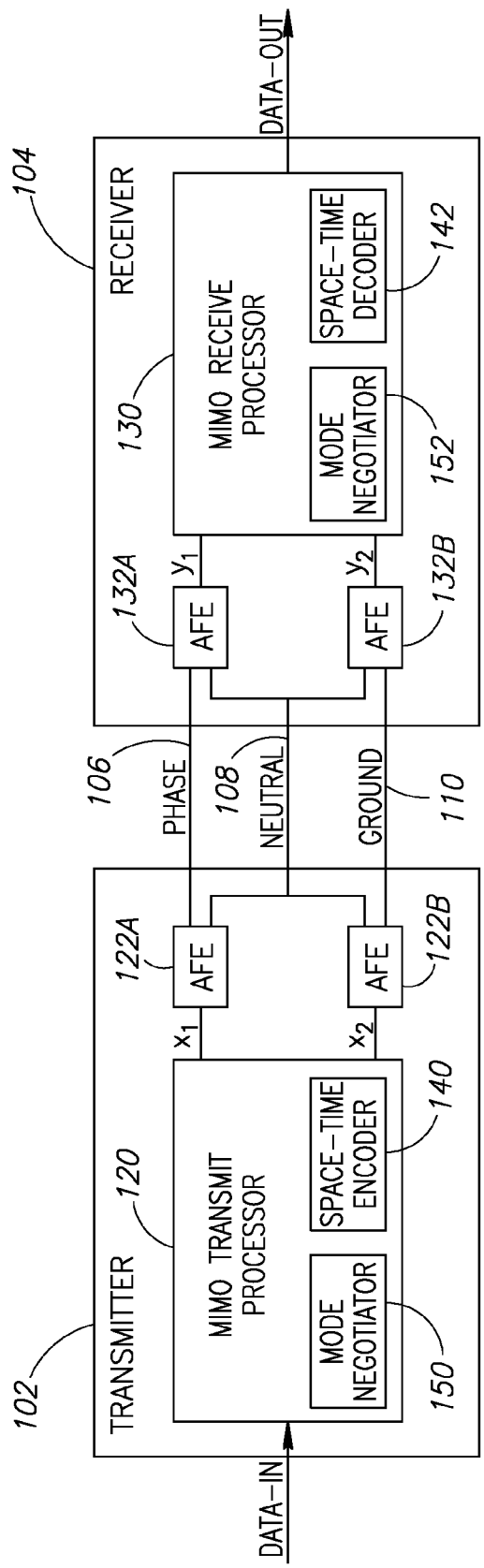
FIG. 3 is a block diagram illustration of the elements of devices forming part of the system of FIG. 2.

Reference is now made to FIG. 3, which details the elements of MIMO devices 101 of FIG. 2. Each MIMO device 101 may comprise a transmitter 102 and a receiver 104, shown in FIG. 3 as separate elements. Thus, transmitter 102 of one MIMO device 101 may communicate over phase, neutral and ground wires 106, 108 and 110, respectively, with receiver 104 of a second MIMO device 101.

In this embodiment, transmitter 102 may comprise a MIMO transmit processor 120 and multiple analog front ends (AFEs) 122, where two AFE's 122A and 122B are shown. AFE 122A may be connected to phase wire 106 and neutral wire 108 and AFE 122B may be connected to neutral wire 108 and ground wire 110. Other combinations of the three wires are possible and are incorporated in the present invention. For example, AFE 122A may be connected to phase wire 106 and ground wire 110 and AFE 122B may be connected to phase wire 106 and neutral wire 108. AFE 122A may be connected to phase wire 106 and ground wire 110 and AFE 122B may be connected to ground wire 110 and neutral wire 108. For the remainder of the present specification, the combination shown in FIG. 3 will be discussed, it being understood that the discussion applies to the other combinations mutatis-mutandis.

Receiver 104 may comprise a MIMO receive processor 130 and multiple analog front ends (AFEs), where, once again, two AFEs 132A and 132B are shown. Similar to transmitter 102, AFE 132A may be connected to phase wire 106 and neutral wire 108 and AFE 132B may be connected to neutral wire 108 and ground wire 110. Each AFE 122 may comprise a digital to analog converter (DAC) and each AFE 132 may comprise an analog to digital converter (ADC). Additionally, each AFE 122 or 132 may comprise analog and/or digital filters, mixers, and amplifiers.

Figure 4:
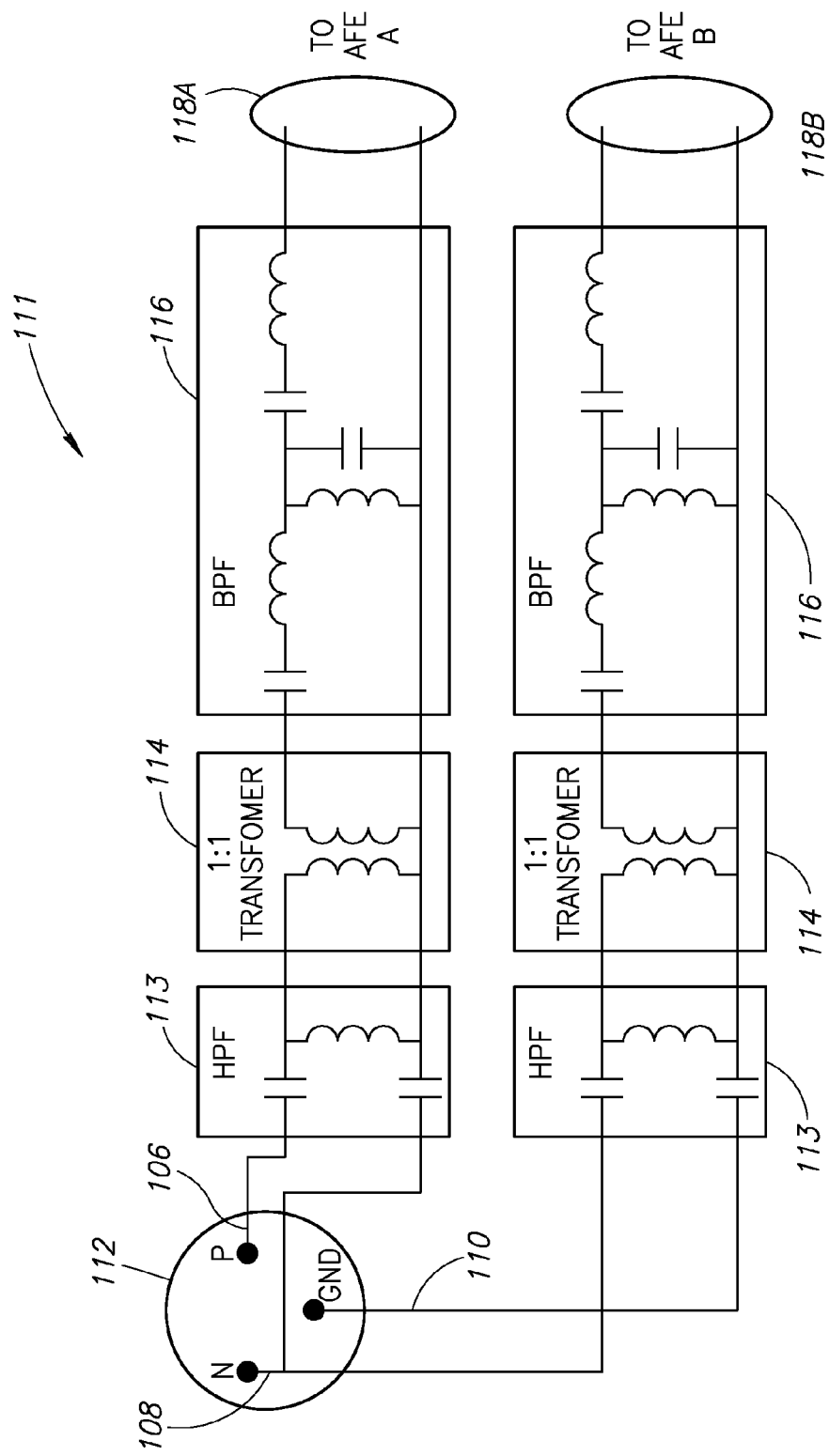
FIG. 4 is a schematic illustration of a balun connection, useful for the devices of FIG. 2.

Reference is now briefly made to FIG. 4, which illustrates a balun connection 111, useful for connecting single phase, MIMO devices 101, such as devices 101A, 101B and 101D, to wires 106, 108 and 110. Balun connection 111 may comprise a three-pronged, electrical plug 112, two high pass filters 113, two transformers 114, two band pass filters 116 and two data connectors 118.

Plug 112 may plug into an electrical outlet (now shown) in the premises, thereby connecting device 101 to the electrical wiring of the premises. The three prongs of plug 112 may connect to phase wire 106, neutral wire 108 and ground wire 110. In the embodiment of FIG. 4, the three wires are combined in a manner similar to that shown in FIG. 3, i.e. phase and neutral wires 106 and 108 form one channel (the "A" channel) and neutral and ground wires 108 and 110 form a second channel (the "B" channel).

Each channel may be processed by high pass filter 113, transformer 114 and band pass filter 116. Each high pass filter 113 may filter only the high frequency signals, such as form the signals transmitted by MIMO devices 101. Thus, each high pass filter 113 may be tuned to pass only those frequencies utilized by MIMO devices 101, thereby keeping out the power signals normally provided by power lines 106, 108 and 110.

Transformers 114 may further operate to isolate the data signals from the power signals and to remove a constant DC bias. Any spikes on power lines 106, 108 or 110 will not be transferred to the other half of transformers 114. However, the high frequency, relatively smooth, data signals will pass through.

Band pass filters 116 may filter out any other noise, maintaining only the frequencies allotted to the data network.

Finally, data connectors 118 may connect each channel to its appropriate AFE. Thus connector 118A may provide channel A to AFE 122A or AFE 132A (depending on whether it is part of transmitter 102 or receiver 104) while connector 118B may provide channel B to AFE 122B or AFE 132B.

It will be appreciated that, as discussed hereinabove, other combinations of the three wires are possible and are incorporated in the present invention. Thus, balun connector 111 may combine different sets of wires to produce channels A and B. However, the processing may remain as shown. Similarly, for multi-phase balun connectors, there may be one multi-phase plug, but more than two channels may be processed.

Transmit processor 120 may process an input data_in datastream, which may comprise the data to be transmitted, usually in the form of packets. Transmit processor 120 may generate two independent signals $x_1$ and $x_2$ therefrom, where signal $x_1$ may be transmitted by AFE 122A between phase wire 106 and neutral wire 108 and signal $x_2$ may be transmitted by AFE 122B between neutral wire 108 and ground wire 110.

Receiver 104 may have a reverse configuration to that of transmitter 102. AFEs 132 may receive and process the signals from the wire, producing received signals $y_1$ and $y_2$. It will be appreciated that received signals $y_1$ and $y_2$ may comprise contributions from both the "straight path" (i.e. the channel to which they are connected) and from the "cross-path" (i.e. the channel(s) to which they are not connected). This relation may be written in the frequency-domain as, $$Y_1(f)=H_{1,1}(f)X_1(f)+H_{1,2}(f)X_2(f),$$

$$Y_2(f)=H_{2,1}(f)X_1(f)+H_{2,2}(f)X_2(f) \quad \text{Equation 1}$$

where $H_{i,j}(f)$ or i,j=1,2 are the frequency-responses of the two channels. These two equations are usually written in matrix form Y=HX. The matrix form is also valid for more than two channels. In general, the number of transmit channels need not be equal to the number of receiver channels, in which case, the matrix H is not square. Preferably, there are more receive channels than transmit channels.

Receive processor 130 may utilize equation 1 to produce signals $x_1$ and $x_2$ and may process signals $x_1$ and $x_2$ to generate a data_out datastream. In one embodiment, the equation for the data_out datastream may be:

$$\begin{bmatrix} X_1 \\ X_2 \end{bmatrix} = \frac{1}{\Delta}\begin{bmatrix} H_{2,2}(f) & -H_{1,2}(f) \\ -H_{2,1}(f) & H_{1,1}(f) \end{bmatrix}\begin{bmatrix} Y_1 \\ Y_2 \end{bmatrix}, \quad \text{Equation 2}$$

where, $$\Delta=H_{1,1}(f)H_{2,2}(f)-H_{1,2}(f)H_{1,2}(f).$$

Equations 1 and 2 provide the operations for two input and two output channels. However, as mentioned hereinabove, the matrix form is also valid for more channels.

It will be appreciated that other MIMO detection methods may also be utilized to generate the data_out datastream.

It will also be appreciated that, by transmitting two signals, the maximum data rate of the system may be increased by up to a factor of 2. This may be achieved by generating two independent signals from the input data_in datastream. For example, transmit processor 120 may place every odd bit into signal $x_1$ and every even bit into signal $x_2$. Other methods of dividing the input datastream are possible and are incorporated into the present invention. For example, the input datastream may be divided by placing the bits for every other QAM symbol into one signal and the rest into the other signal.

Alternatively, the two channels may be used to increase channel diversity thereby increasing redundancy and increasing the chances that each data packet be properly received. For this embodiment, transmit processor 120 may comprise a space-time encoder 140 and receive processor 130 may comprise a space-time decoder 142, whereby the same information may be encoded onto the two paths in a generally efficient manner. An exemplary space-time encoding method may use the Alamouti code, used in wireless communications and described in the article by S. M. Alamouti, "A simple transmit diversity technique for wireless communications," in *IEEE J. Select. Areas Commun.*, vol. 16, pp. 1451-1458, October 1998.

With the space-time encoding, data which might otherwise be lost may be recovered. For example, if the connection between phase wire 106 and neutral wire 108 is hit by impulse noise, causing data to be corrupted, data may be retrieved from the signal carried by the connection between neutral wire 108 and ground wire 110 (this is particularly true when the second channel is more weakly affected by the impulse).

Transmitter 102 and receiver 104 may comprise mode negotiators 150 and 152, respectively, to select between transmitting two independent signals, when the channels are relatively clean, and transmitting with spatial diversity, when one or both of the channels is noisy, as discussed hereinabove.

It will be appreciated that the present invention may utilize all of the wires for the network. This may provide significant advantages over the prior art, which utilized only two of the wires, in different combinations.

Returning to FIG. 2, circuits belonging to the same phase are connected together via circuit breakers 162. However, circuits belonging to different phases, for example, the circuits on internal phase wires 106B and 106G, have no galvanic connection between them. Thus, MIMO device 101A, connected to internal phase wire 106B, and MIMO device 101D connected to internal phase wire 106G, may have a problem communicating, even though both are connected to an internal phase wire.

One prior art solution (described in the book *Power line Communications*, by Dorset), Prentice Hall, N.J., 2001) is to add a high pass coupler, such as a capacitor, between phases, to couple the phases only in the high frequencies in which the home network operates.

The present invention, however, has a second channel, along the neutral and ground wires. Since neutral wire 108 and ground wire 110 typically are common to all circuits in each premises of a building, communications over wires 108 and 110 may not suffer from the lack of galvanic connection. Thus, when the source and destination network devices are connected to circuits on different phases, mode negotiators 150 and 152 may select to utilize spatial diversity (in an attempt to have a clean signal at least on the second channel) rather than the faster speed provided with independent signals.

In another example, some countries mandate that ground wire 110 and neutral wire 108 of any premises be short-bonded via shunt resistor 168. Unfortunately, this bonding may cause high attenuation, and thus, poor communication, between neutral wire 108 and ground wire 110 for any path traversing the main panel. Thus, communications between ground wire 110 and neutral wire 108 may be effective only when the source and destination network devices are both at a fair distance from the main panel and on the same circuit.

Once again, the present invention may solve this problem, for stations close to the main panel, through space-time encoder 140 and space-time decoder 142. Alternatively or in addition, as suggested by Dostert, an inductor 170 may be added to the main panel, connected in series with the shunt resistor. Inductor 170 may decouple ground wire 110 and neutral wire 108 in the high frequencies of the network, thus providing communications between ground wire 110 and neutral wire 108 even for stations near the main panel.

It is noted that there typically is a further protection for the premises. Most premises include a residual current device (RCD), which is activated whenever it senses a current imbalance, i.e., when there is a difference between the total current going into the house on all phase wires and the total current going out of the house on the neutral wire. This is intended to protect against electrocutions, where a person may conduct current from a phase wire to the ground. The maximum current imbalance is set to 5 mA in the USA and 10-30 mA in Europe.

Network signals passing on the neutral-ground channel may cause an imbalance between the neutral and phase wires at the entrance to the main panel. Due to the presence of the RCD, this imbalance should be limited to a relatively low threshold. In accordance with a preferred embodiment of the present invention, the power level of AFE 122B, which may transmit on neutral wire 108 and ground wire 110, may be substantially less than that of AFE 122A, which may transmit across phase wire 106 and neutral wire 108.

It will be appreciated that mode negotiators 150 and 152 may select which of the modes of operation discussed herein that may be appropriate for each channel based on the measured channel characteristics and the desired speed of operation.

Figure 5:
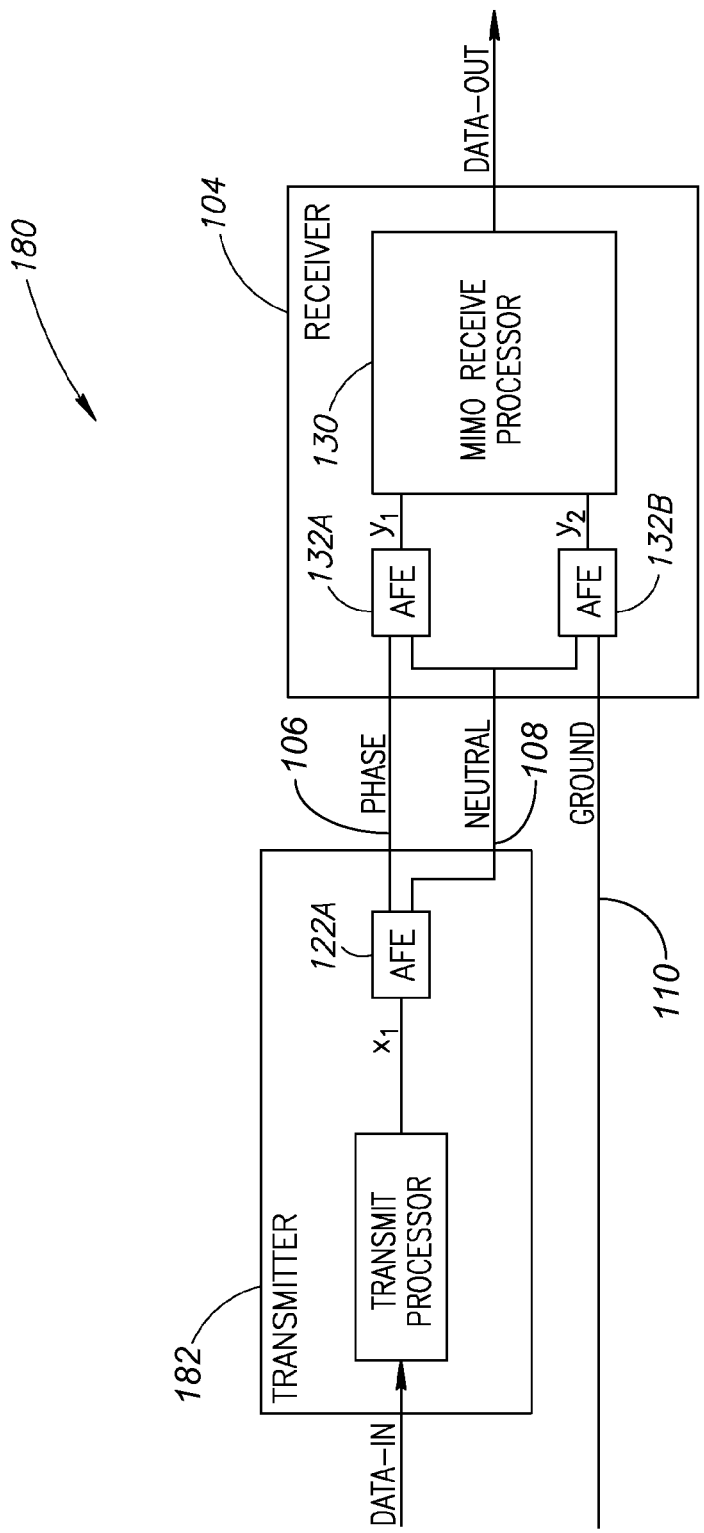
FIG. 5 is a schematic illustration of an alternative embodiment of the present invention.

In accordance with an alternative preferred embodiment of the present invention, shown in FIG. 5 to which reference is now made, MIMO devices 180 may comprise a single channel transmitter 182 and MIMO receiver 104. Once again, the elements are shown as parts of separate devices. Transmitter 182 may be connected to phase and neutral wires 106 and 108, respectively, while receiver 104 may be connected to all three wires, 106, 108 and 110.

Due to the neutral-phase imbalance discussed hereinabove, the transmit signal carried across phase and neutral wires 106 and 108, respectively, may induce a current in ground wire 110, which may be measured by receiver 104. MIMO receive processor 130 may utilize maximum ratio combining (MRC), for example, to combine the two signals into a signal s, defined as:

$$s = \frac{h_1^* y_1 + h_2^* y_2}{h_1^* h_1 + h_2^* h_2}, \qquad \text{Equation 3}$$

where $y_i$ and $h_i$ denote the received signal and channel coefficient in the frequency-domain, respectively, for AFE's i=1 and 2, and where $h_i^*$ denotes the complex-conjugate of $h_i$.

The signal s may be considered a "sufficient statistic" for decoding and MIMO receive processor 130 may utilize the signal s to decode the incoming signal. Because the signal s may be a sufficient statistic, there may be no need to consider the signals $y_1$ and $y_2$ separately. Moreover, the signal s may be generated without the denominator and/or multiplied by a constant not dependent on the signals $y_1$ and $y_2$, if desired.

It will be appreciated that transmitter 182 may be connected to any combination of the power wires as the transmission on those wires will induce a current in the remaining wire.

Figure 6:
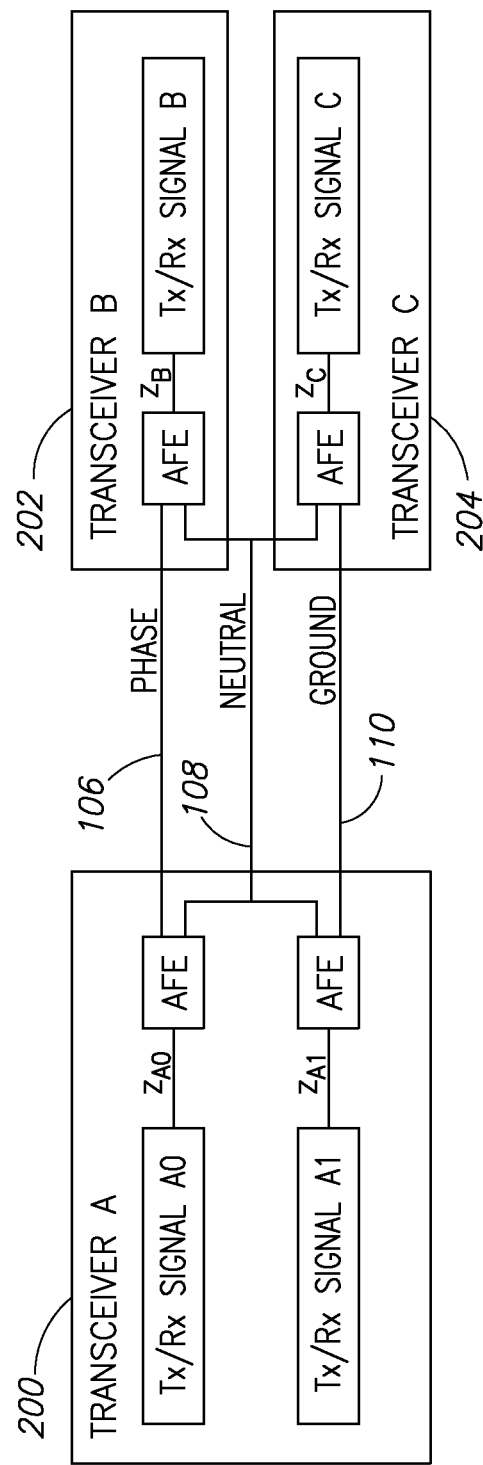
FIG. 6 is a schematic illustration of a further alternative embodiments of the present invention.

Reference is now made to FIG. 6, which illustrates a further embodiment of the present invention. In FIG. 6, a spatially divided multiplexing algorithm (SDMA), such as is known in the art (one explanation may be found in the Wikipedia under the title "Multi-User MIMO"), may be utilized, where a single transceiver, labeled 200, may communicate two independent information streams $Z_{a0}$ and $Z_{a1}$ to two different destinations (transceivers 202 and 204) possibly simultaneously and using overlapping frequency bands. In FIG. 6, one pair of wires (e.g., phase wire 106 and neutral wire 108) may be allocated to transceiver 202 and another pair of wires (e.g., neutral wire 108 and ground wire 110) may be allocated to transceiver 204. Communications may flow in both directions between transceivers 200 and 202 and between transceivers 200 and 204. Thus, it may be possible to establish two independent and concurrent communication channels which use the same frequency band. Conversely, transceivers 202 and 204 may act as two separate transmitters, transmitting to the same destination, transceiver 200, simultaneously using the same frequency band, by using different pairs of wires. Transceiver 200 may have two separate receive processors, one for each channel.

It will be appreciated that network devices using the concepts of the present invention may have a transmitter, a receiver or both, as desired.

Applicants have realized that the present invention may be applied to other types of wires in a subscriber premises, in order to improve the quality of communications services provided in the local area network of the premises. For example, the present invention may be applied to phone line wires as well, in premises where the phone line cables carry two or more pairs in them.

Applicant has realized that adjacent phone line pairs may have crosstalk (i.e. each pair may also receive signals carried by the other pair(s) in the cable). This crosstalk interferes with the ability of a single receiver to properly interpret the signal on its own channel. However, Applicants have realized that MIMO receiver 130 (FIG. 5) may handle such crosstalk through the matrix form of equation 1, which, as discussed hereinabove, handles contributions from both the "straight path" and from the "cross-path(s)" (i.e. the crosstalk). In this embodiment, there may be two or more channels.

Figure 7:
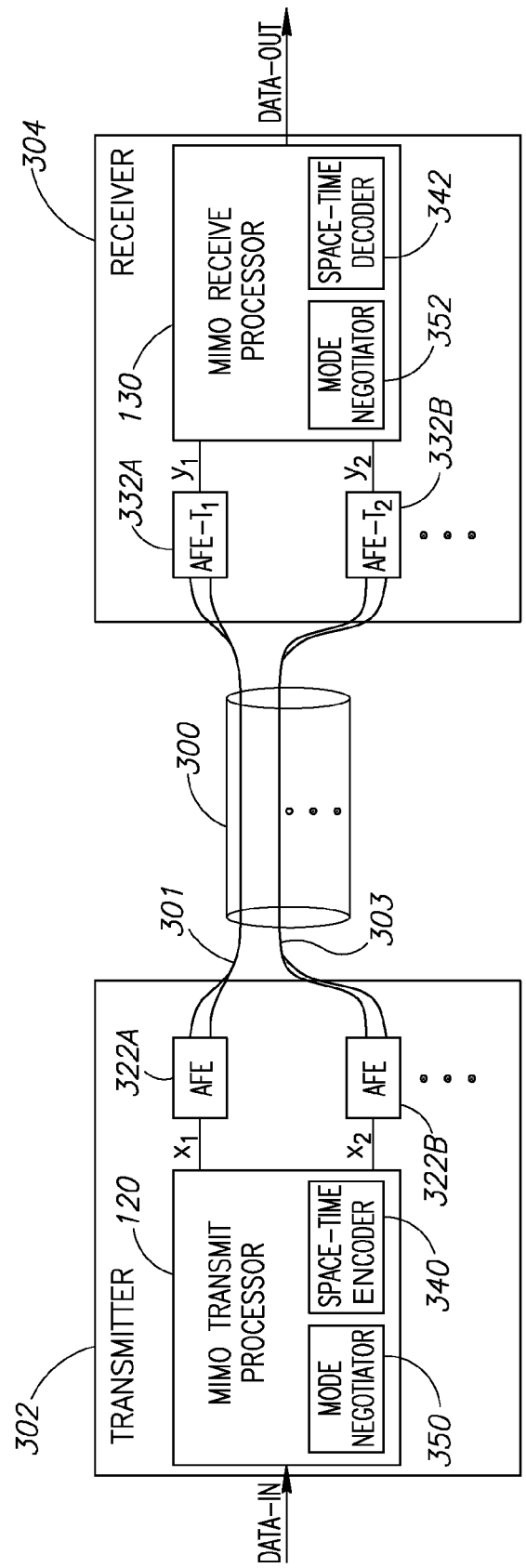
FIG. 7 is a schematic illustration of a novel communication system over multiple phone line wires, such as may be found in a home or office, constructed and operative in accordance with a preferred embodiment of the present invention.

Reference is now made to FIG. 7, which illustrates an alternative embodiment of the present invention operative over multiple pair, phone line cables, such as cable 300. Cable 300 may be any suitable phone line cable which may be found in a subscriber premises, such as CAT5 cable (with five pairs of phone line wires), phone line wiring (with two pairs of phone line wires), CAT3, quad, twisted pair or flat pair wiring. In FIG. 7, cable 300 has at least two pairs 301 and 303 of phone line wires.

As in the previous embodiments, there may be a transmitter 302 and a receiver 304, designed separately or as part of the same device. Transmitter 302 may comprise MIMO transmit processor 120 and multiple analog front ends (AFEs) 322. Two AFE's 322A and 322B are shown in FIG. 7, though more are possible, as indicated by the ellipses. In FIG. 7, AFE 322A is connected to phone line pair 301 and AFE 322B is connected to phone line pair 303. Transmitter 302 may also comprise a space-time encoder 340 and a mode negotiator 350.

Receiver 304 may comprise MIMO receive processor 130 and multiple analog front ends (AFEs) 332. Two AFE's 332A and 332B are shown, though more are possible. AFE 332A is connected to phone line pair 301 and AFE 332B is connected to phone line pair 303. Receiver 304 may also comprise a space-time decoder 342 and a mode negotiator 352.

Space-time encoder 340 and decoder 342 may be similar to space-time encoder 140 and decoder 142 of the previous embodiments. However, there may be more channels. In general, the number of MIMO channels for this embodiment may be equal to the number of phone line wire pairs, which may be more than 2.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A multiple-input, multiple-output (MIMO) communications receiver for an in-premises multi-point network, the receiver comprising:
    a multiplicity of analog front ends each connectable to a different two of a plurality of wires in a subscriber premises, said plurality of wires forming a shared medium of said network, and each said analog front end to receive data of one channel; and
    a MIMO processor to process together data received from said channels, at least a portion of said data being received simultaneously from said channels,
    wherein said multiplicity is at least two,
    wherein said wires are phase, neutral and ground power line wires of said premises,
    wherein one analog front end is connectable to said phase and neutral wires, thereby forming a first channel and another analog front end is connectable to said neutral and ground wires, thereby forming a second channel,
    wherein one of said first channel and said second channel is a straight path channel and wherein the other one of said first channel and said second channel is a cross-path channel, and
    wherein said MIMO processor uses maximum ratio combining (MRC) to process said data received from said straight path channel and said cross-path channel.

2. A multiple-input, multiple-output (MIMO) communications receiver for an in-premises multi-point network, the receiver comprising:
    a multiplicity of analog front ends each connectable to a different two of a plurality of wires in a subscriber premises, said plurality of wires forming a shared medium of said network, and each said analog front end to receive data of one channel; and
    a MIMO processor to process together data received from said channels, at least a portion of said data being received simultaneously from said channels,
    wherein said multiplicity is at least two,
    wherein said wires are phase, neutral and ground power line wires of said premises,
    wherein one analog front end is connectable to said phase and ground wires, thereby forming a first channel and another analog front end is connectable to said phase and neutral wires, thereby forming a second channel, wherein one of said first channel and said second channel is a straight path channel and wherein the other one of said first channel and said second channel is a cross-path channel, and wherein said MIMO processor uses maximum ratio combining (MRC) to process said data received from said straight path channel and said cross-path channel.

3. A multiple-input, multiple-output (MIMO) communications receiver for an in-premises multi-point network, the receiver comprising:

a multiplicity of analog front ends each connectable to a different two of a plurality of wires in a subscriber premises, said plurality of wires forming a shared medium of said network, and each said analog front end to receive data of one channel; and a MIMO processor to process together data received from said channels, at least a portion of said data being received simultaneously from said channels, wherein said multiplicity is at least two, wherein said wires are phase, neutral and ground power line wires of said premises, wherein one analog front end is connectable to said phase and ground wires, thereby forming a first channel and another analog front end is connectable to said ground and neutral wires, thereby forming a second channel, wherein one of said first channel and said second channel is a straight path channel and wherein the other one of said first channel and said second channel is a cross-path channel, and p1 wherein said MIMO processor uses maximum ratio combining (MRC) to process said data received from said straight path channel and said cross-path channel.

4. A method of communicating across power lines, the method comprising:

communicating data between at least two in-premises network devices along more than one channel, each channel defined by a different two of a plurality of wires in a subscriber premises, a first one of said more than one channel forming a straight path channel and a second one of said more than one channel forming a cross-path channel; and using multiple-input, multiple-output (MIMO) processing and maximum ratio combining (MRC) processing of data received along said plurality of wires, at least a portion of said data being received simultaneously from said straight path channel and said cross-path channel, wherein said wires are phase, neutral and ground wires of a subscriber premises.

5. The method according to claim 4, wherein one of said at least two in-premises network devices is connectable to said phase and ground wires and another one of said at least two in-premises network devices is connectable to said phase and neutral wires.

6. The method according to claim 4, wherein one of said at least two in-premises network devices is connectable to said phase and ground wires and another one of said at least two in-premises network devices is connectable to said ground and neutral wires.

7. The method according to claim 4, wherein one of said at least two in-premises network devices is connectable to said phase and neutral wires and another one of said at least two in-premises network devices is connectable to said ground and neutral wires.

* * * * *